US012306103B2

(12) United States Patent
Foelling et al.

(10) Patent No.: US 12,306,103 B2
(45) Date of Patent: May 20, 2025

(54) FLUORESCENCE MICROSCOPE AND METHOD FOR IMAGING A SAMPLE

(71) Applicant: LEICA MICROSYSTEMS CMS GMBH, Wetzlar (DE)

(72) Inventors: Jonas Foelling, Freiburg (DE); Lars Friedrich, Weinheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 557 days.

(21) Appl. No.: 17/603,596

(22) PCT Filed: Apr. 16, 2020

(86) PCT No.: PCT/EP2020/060696
§ 371 (c)(1),
(2) Date: Feb. 14, 2022

(87) PCT Pub. No.: WO2020/212480
PCT Pub. Date: Oct. 22, 2020

(65) Prior Publication Data
US 2022/0196555 A1 Jun. 23, 2022

(30) Foreign Application Priority Data
Apr. 17, 2019 (DE) .......................... 102019110160.3

(51) Int. Cl.
*G01N 21/64* (2006.01)
(52) U.S. Cl.
CPC ..... *G01N 21/6458* (2013.01); *G01N 21/6408* (2013.01)
(58) Field of Classification Search
None
See application file for complete search history.

(56) References Cited

U.S. PATENT DOCUMENTS 5,731,588 A * 3/1998 Hell .................. G02B 21/0076
250/459.1
7,551,350 B2 * 6/2009 Iketaki .................. G02B 27/58
359/368

(Continued)

FOREIGN PATENT DOCUMENTS

CN 103163106 A 6/2013
CN 109313328 A 2/2019
(Continued)

OTHER PUBLICATIONS

Auksorius, Egidijus et al. "Simulated emission depletion microscopy with a supercontinuum source and fluorescence lifetime imaging," Optics Letters, vol. 33, No. 2, Jan. 15, 2008, pp. 113-115, Optical Society of America, US.

(Continued)

*Primary Examiner* — Marcus H Taningco
*Assistant Examiner* — Djura Malevic
(74) *Attorney, Agent, or Firm* — LEYDIG, VOIT & MAYER, LTD.

(57) ABSTRACT

A fluorescence microscope includes excitation and de-excitation light sources designed to generate excitation and de-excitation light distributions, which excite and de-excite fluorophores present in a sample, respectively. An illumination unit is designed to combine the light distributions such that an intensity maximum of the excitation light distribution and an intensity minimum of the de-excitation light distribution are spatially superimposed on one another in an illumination target point. A detector is designed to detect the fluorescence photons as a function of their arrival times. The processor is designed to evaluate the detected fluorescence photons with respect to their arrival times and, based thereon, to control a delay which a light pulse or a light modulation of the de-excitation light distribution has at a position of the illumination target point in relation to a light (Continued)

pulse or a light modulation of the excitation light distribution.

14 Claims, 3 Drawing Sheets (56) References Cited

U.S. PATENT DOCUMENTS

| | | | | |
|---|---|---|---|---|
| 7,652,266 | B2* | 1/2010 | Squirrell | G01N 21/645 |
| | | | | 250/458.1 |
| 7,663,122 | B2* | 2/2010 | Hayano | G01M 3/38 |
| | | | | 250/458.1 |
| 7,897,937 | B2* | 3/2011 | Engelhardt | G01N 21/6428 |
| | | | | 250/459.1 |
| 9,335,211 | B2* | 5/2016 | Vasic | G07D 7/1205 |
| 9,551,658 | B2* | 1/2017 | Hell | G02B 21/16 |
| 9,575,302 | B2* | 2/2017 | Booth | G02B 21/0072 |
| 9,632,296 | B2* | 4/2017 | Wolleschensky | G02B 6/08 |
| 9,721,326 | B2* | 8/2017 | Piché | G06T 3/4053 |
| 9,772,285 | B2* | 9/2017 | Vicidomini | G01N 21/6458 |
| 9,995,681 | B2* | 6/2018 | Conroy | G01N 33/2882 |
| 10,268,033 | B2* | 4/2019 | Sase | G02B 21/16 |
| 10,527,838 | B2* | 1/2020 | Sase | G02B 21/367 |
| 10,535,974 | B2* | 1/2020 | Huang | G01S 7/4802 |
| 10,656,089 | B2* | 5/2020 | Butte | G01N 21/6408 |
| 10,955,649 | B2* | 3/2021 | Boersch | G02B 21/0064 |
| 11,650,158 | B2* | 5/2023 | Foelling | G02B 21/0076 |
| | | | | 250/459.1 |
| 2008/0258077 | A1* | 10/2008 | Baer | G03F 7/704 |
| | | | | 250/459.1 |
| 2009/0250632 | A1 | 10/2009 | Kempe et al. | |
| 2010/0176307 | A1* | 7/2010 | Hell | G01N 21/636 |
| | | | | 250/459.1 |
| 2013/0087719 | A1* | 4/2013 | Yang | G02B 21/16 |
| | | | | 250/459.1 |
| 2013/0256564 | A1* | 10/2013 | Hell | G01N 21/64 |
| | | | | 250/459.1 |
| 2013/0307603 | A1 | 11/2013 | Koester | |
| 2015/0008309 | A1* | 1/2015 | Wolleschensky | G02B 27/58 |
| | | | | 250/208.1 |
| 2015/0338625 | A1 | 11/2015 | Sieckmann et al. | |
| 2016/0187259 | A1* | 6/2016 | Vicidomini | G01N 21/6428 |
| | | | | 250/206 |
| 2016/0238532 | A1* | 8/2016 | Freudiger | G02B 21/16 |
| 2017/0031145 | A1 | 2/2017 | Takiguchi | |
| 2017/0102532 | A1 | 4/2017 | Frankel | |
| 2017/0284940 | A1* | 10/2017 | Butte | G01J 3/4406 |
| 2019/0219835 | A1 | 7/2019 | Skinner et al. | |
| 2019/0239753 | A1* | 8/2019 | Wentz | G01J 3/2803 |
| 2019/0324242 | A1* | 10/2019 | Boersch | G02B 21/0076 |
| 2019/0339201 | A1 | 11/2019 | Seyfried et al. | |
| 2020/0333252 | A1* | 10/2020 | Krachmalnicoff | |
| | | | | G02B 21/0072 |
| 2022/0196555 | A1* | 6/2022 | Foelling | G02B 21/0084 |

FOREIGN PATENT DOCUMENTS

| | | |
|---|---|---|
| CN | 109477796 A | 3/2019 |
| DE | 102004039035 A1 | 10/2005 |
| DE | 102006047912 A1 | 9/2009 |
| DE | 102008019957 A1 | 11/2009 |
| DE | 102012216002 B3 | 9/2013 |
| DE | 202013102039 U1 | 5/2014 |
| DE | 202013006817 U1 | 10/2014 |
| DE | 202015001565 U1 | 10/2015 |
| WO | WO 2013190058 A1 | 12/2013 |

OTHER PUBLICATIONS

Blom H and Widengren J: "Stimulated Emission Depletion Microscopy", Chemical Reviews, vol. 117, Nr. 11, Jun. 14, 2017 (Jun. 14, 2017), pp. 7377-7427, XP055710257, American Chemical Society, US.

Vicidomini, Giuseppe et al. "Sharper low-power STED nanoscopy by time gating," Nature Methods, Jun. 5, 2011, 8, pp. 1-5, Nature America, Inc., US.

* cited by examiner

FLUORESCENCE MICROSCOPE AND METHOD FOR IMAGING A SAMPLE

CROSS-REFERENCE TO PRIOR APPLICATIONS

This application is a U.S. National Phase application under 35 U.S.C. § 371 of International Application No. PCT/EP2020/060696, filed on Apr. 16, 2020, and claims benefit to German Patent Application No. DE 10 2019 110 160.3, filed on Apr. 17, 2019. The International Application was published in German on Oct. 22, 2020, as WO 2020/212480 A1 under PCT Article 21(2).

FIELD

The invention relates to a fluorescence microscope and a method for imaging a sample using a fluorescence microscope.

BACKGROUND

The so-called STED method is often used in the field of fluorescence microscopy for ultrahigh-resolution imaging of a sample, in which the sample is illuminated using a light distribution which is generated from a superposition of excitation light and de-excitation light. STED stands here for "stimulated emission depletion". The excitation light is designed to excite fluorophores present in the sample to the spontaneous emission of fluorescent light. In contrast, the de-excitation light is used to de-excite fluorophores excited by the excitation light in the course of a stimulated emission of fluorescent light. To increase the image resolution, the de-excitation light is superimposed with a special light distribution on the excitation light, which is focused in the form of a laser beam on the illumination target point in the sample. This de-excitation light distribution typically has a central intensity zero point, while the intensity rises as rapidly as possible around this zero point. To achieve the best possible image resolution, the de-excitation light distribution has to be superimposed on the excitation light distribution so that the zero point of the de-excitation light distribution coincides precisely with the intensity maximum of the excitation light distribution. If this is ensured, the spontaneous emission of fluorescent light in the outer regions of the excitation light distribution is thus suppressed in the illumination target point, so that spontaneously emitted fluorescent light is only detected from a central region around the zero point of the de-excitation light distribution. If this sample region is moved in a scanning method over a plurality of illumination target points of the sample, a high-resolution image of the sample can thus be obtained by the detection of the fluorescent light not suppressed by the de-excitation light distribution.

The de-excitation light distribution typically has a different wavelength than the excitation light distribution. The de-excitation light distribution is most commonly strongly red shifted, so that its wavelength is in the emission spectrum, but not in the excitation spectrum of the fluorophore. It is thus ensured that the de-excitation light distribution de-excites the excited fluorophores by stimulated emission without exciting them again.

In this type of microscopy, short-pulsed laser light sources are often used for excitation and de-excitation. The light source which provides the excitation light can be operated, for example, at a pulse length of approximately 150 ps. In contrast, the light source, the light of which is used to de-excite the fluorophores, typically operates using a somewhat longer pulse length, for example approximately 800 ps.

SUMMARY

In an embodiment, the present invention provides a fluorescence microscope that includes an excitation light source, a de-excitation light source, an illumination unit, a detector and a processor. The excitation light source is designed to generate a pulsed or modulated excitation light distribution, which excites fluorophores present in a sample to spontaneous emission of fluorescence photons. The de-excitation light source is designed to generate a pulsed or modulated de-excitation light distribution, which de-excites the fluorophores excited by the excitation light distribution in the sample in a course of a stimulated emission of fluorescence photons. The illumination unit is designed to combine the excitation light distribution and the de-excitation light distribution in such a way that an intensity maximum of the excitation light distribution and an intensity minimum of the de-excitation light distribution are spatially superimposed on one another in an illumination target point. The detector is designed to detect the fluorescence photons emitted from the illumination target point as a function of arrival times of the fluorescence photons. The processor is designed to evaluate the fluorescence photons detected in the illumination target point with respect to their arrival times and, based on the evaluation, to control a delay which a light pulse or a light modulation of the de-excitation light distribution has at a position of the illumination target point in relation to a light pulse or a light modulation of the excitation light distribution.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In order that effective stimulated emission and thus a resolution increase are achieved, the excitation pulses and the de-excitation pulses not only have to be spatially superimposed well, but rather also precisely synchronized with one another with respect to time. In particular, it is to be ensured that the de-excitation light pulse is incident on the illumination target point with a short delay after the excitation light pulse. A short delay is to be understood here as a time period which is short in comparison to the mean lifetime of the excited state of the fluorophore. This mean lifetime is typically in a range from one to several nanoseconds. If the delay between the two light pulses is excessively short, or the illumination with the de-excitation light pulse even takes place earlier than with the excitation light pulse, no stimulated emission thus takes place, since the fluorophores have not yet even been transferred by the excitation light into the excited state. In contrast, if the delay between the two light pulses is excessively long, the fluorophores begin to emit fluorescent light in the course of the spontaneous emission again already after the excitation in the ranges of the excitation light distribution in which the spontaneous emission of fluorescent light is actually to be suppressed by stimulated emission. This results in worsened resolution of the fluorescence microscope.

Embodiments of the invention provide a fluorescence microscope and a method for imaging a sample using such a fluorescence microscope which enable the excitation light distribution and the de-excitation light distribution to be matched with one another precisely with respect to time in a simple manner.

A fluorescence microscope, in particular an STED microscope, is provided according to an embodiment of the invention, comprising an excitation light source which is designed to generate a pulsed or modulated excitation light distribution, which excites fluorophores present in the sample to the spontaneous emission of fluorescence photons, and a de-excitation light source, which is designed to generate a pulsed or modulated de-excitation light distribution, which de-excites the fluorophores excited in the sample by the excitation light distribution in the course of a stimulated emission of fluorescence photons. The fluorescence microscope furthermore comprises an illumination unit, which is designed to combine the excitation light distribution and the de-excitation light distribution in such a way that an intensity maximum of the excitation light distribution and an intensity minimum of the de-excitation light distribution are spatially superimposed on one another in an illumination target point. Furthermore, the fluorescence microscope comprises a detector, which is designed to detect the fluorescence photons emitted from the illumination target point as a function of their arrival times. Finally, the fluorescence microscope comprises a processor, which is designed to evaluate the fluorescence photons detected in the illumination target point with respect to their arrival times and to control a delay on the basis of this evaluation, which a light pulse or a light modulation of the de-excitation light distribution has at the position of the illumination target point in relation to a light pulse or a light modulation of the excitation light distribution.

Using this fluorescence microscope, it is not only possible to measure the intensity of the fluorescent light emitted from the respective illumination target point, as is typical in conventional STED microscopes. Rather, the processor provided in the fluorescence microscope is additionally designed to analyze the arrival times of the fluorescence photons detected by the detector, which correlate with the lifetime of the excited state of the fluorophores. On the basis of this analysis, the processor controls the synchronization of the de-excitation light distribution relative to the excitation light distribution. For the purposes of time referencing, the two light sources are each designed as pulsed or modulated sources, wherein the use of a pulsed source offers certain advantages in relation to a modulated source, since the lifetime of the fluorophores observed in the present context is generally so short that a very rapid light modulation is necessary to enable precise synchronization.

With the arrival times of the fluorescence photons, a measured variable is available, on the basis of which the synchronization between the de-excitation light distribution and the excitation light distribution may be adjusted to optimize the imaging quality. This measured variable is in particular not coupled to other system parameters which also influence the imaging quality. Thus, in conventional STED microscopes, the problem exists in particular that a time matching between excitation light and de-excitation light which is only adjusted poorly does result in worse optical resolution visible to the user, as explained at the outset, but the latter can also be provided for numerous other reasons. Thus, a similar effect of the resolution worsening also results, for example, if the intensities of excitation and de-excitation light are not matched well with one another. This also applies in the case of imprecise spatial superposition of the light distributions or also for the case that the intensity minimum of the de-excitation light distribution is not actually a zero point, i.e., too much residual light is present in the central minimum of the de-excitation light distribution. A measured variable independent of the above-mentioned influences is provided by the arrival times of the fluorescence photons detected by the detector, which enables optimization of the time matching of the light distributions even if, for example, the spatial superposition of the light distributions is not optimal or also the light intensities are not precisely matched with one another.

In particular, it is possible using the proposed fluorescence microscope to optimize the matching with respect to time between excitation and de-excitation light in an automated manner, for example by processing a predetermined algorithm, without the experience and the skill of the user being important for this purpose, as has previously been typical. A preset is thus typically proposed to the user in conventional systems, using which STED images can indeed be generated. However, the quality thereof is generally not optimal. For further optimization, the user then has the option of finely adjusting relevant parameters himself until the desired image quality is achieved. These parameters include, as explained above, for example, the relative arrangement of the light distributions, the light intensities of excitation and de-excitation light, and also the time difference between excitation and de-excitation light pulse. To optimize the image quality, the user has previously had to adjust these parameters himself and in the event of poor image quality, find the parameter or the parameter combination which most favorably influences the image quality. Successful optimization of the parameters is therefore not least dependent on the experience and the skill of the user in conventional systems and can only be automated with difficulty due to the mutual dependency of the parameters.

The proposed solution is all the more advantageous because the best possible synchronization between excitation and de-excitation light often varies with the type of the fluorophore used, but also from sample to sample and even within a sample. This is because the average lifetime of the excited state changes from fluorophore to fluorophore and is also dependent on the microenvironment of the fluorophore.

It is to be emphasized that the above-described matching with respect to time between excitation and de-excitation light distribution can take place during the actual image recording. The fluorescence microscope can therefore be handled particularly easily and does not place any special demands on the user with respect to the synchronization of the light distributions.

The detector is preferably designed to detect the fluorescence photons emitted from the illumination target point by time-correlated single photon counting as a function of their arrival times. The application of such time-correlated single photon counting enables particularly precise detection of the arrival times.

In one preferred embodiment, the detector is designed to detect the arrival times of the fluorescence photons in relation to a starting time, which is defined by the light pulse or the light modulation of the excitation light distribution or the de-excitation light distribution. In particular, the use of the light pulse of the excitation light distribution offers the option of time referencing, on the basis of which the arrival times of the fluorescence photons at the detector may be precisely detected.

The processor preferably evaluates the fluorescence photons detected in the illumination target point in that it compares a chronological distribution of the fluorescence photons given by the detected arrival times to a target distribution and controls the delay on the basis of this comparison. A measured variable is provided in the form of the chronological distribution of the fluorescence photons detected by the detector which may be compared in a simple manner to a previously defined target distribution. On the basis of the deviation which the measured chronological distribution has in relation to the target distribution, the delay may then be controlled so that the abovementioned deviation is minimized. This can be carried out in particular in the manner of a control loop. The target distribution can be predetermined in dependence on the respective fluorophore type used, in particular in consideration of the average lifetime of the excited state of the fluorophore.

The target distribution preferably has in chronological succession a distribution maximum, a first decreasing distribution section, and a second, relatively more weakly decreasing distribution section. In this embodiment, the target distribution used for evaluating the detected arrival times represents a distribution which represents two different populations of lifetimes. A first, short-lived population, which is assigned to the first decreasing distribution section following the distribution maximum, represents in one part fluorophores which have been located at the point of the central intensity minimum of the de-excitation light distribution. In the other part, the first, short-lived population represents fluorophores which have been located in ranges of the de-excitation light distribution outside the intensity minimum and which have succeeded in emitting a fluorescence photon spontaneously before they have been de-excited by the de-excitation light distribution in the course of the stimulated emission. However, the probability for the latter indicated scenario decreases with the duration of the de-excitation light pulse, so that these fluorescence photons can only be detected directly at the beginning of the pulse of the de-excitation light and shortly after the pulse of the excitation light. Fluorescence photons which are emitted by stimulated emission have essentially the same wavelength as the de-excitation light and are therefore not detected, for example, due to use of a suitable blocking filter. In contrast, a second, long-lived population essentially represents those fluorophores which have not been de-excited by the pulse of the de-excitation light, i.e., those fluorophores which have been located in the intensity minimum of the de-excitation light distribution or in its vicinity. The different negative gradients of the two distribution sections thus occur in that during the time period assigned to the first distribution section, the photon counting rate drops faster due to the effect of the de-excitation light than during the time period assigned to the second distribution section, in which the photon counting rate drops according to the spontaneous fluorescence of the fluorophore. The second distribution section shows an essentially exponential drop having a time constant typical for the fluorophore used, which reflects the exponential decrease of the fluorescent light by spontaneous emission.

In one particularly preferred embodiment, the processor adjusts the delay on the basis of the comparison in the manner of a control loop. In this way, it is possible to ensure optimal time matching between excitation light and de-excitation light during the entire image recording.

In one advantageous embodiment, the fluorescence microscope comprises a delay unit which is controllable by the processor on the basis of the evaluation to adjust the delay. By using such a delay unit activatable by the processor, it is possible to synchronize the excitation light and the de-excitation light precisely with comparatively little technical expenditure.

The delay unit is preferably connected upstream from the excitation light source or the de-excitation light source and outputs a first trigger signal to this light source, in order to adjust the delay. In this embodiment, the light of that light source from which the delay unit is connected upstream is delayed in relation to the light of the other light source. If the delay unit is connected upstream from the de-excitation light source, for example, the synchronization adjustment thus takes place on the basis of the de-excitation light, while the excitation light remains uninfluenced with respect to time. Vice versa, the excitation light is influenced with respect to time, while the de-excitation light remains unchanged in its time curve if the delay unit is connected upstream from the excitation light source.

In one preferred embodiment, it is provided that the one of the two light sources from which the delay unit is not connected upstream outputs a second trigger signal to the delay unit and the delay unit generates a signal with a time delay in relation to this second trigger signal as the first trigger signal. The second trigger signal more or less specifies a reference clock here, with respect to which the light emitted by one of the two light sources is to be delayed so that the desired time matching is achieved.

In the above-explained embodiment, the one light source preferably outputs the second trigger signal to the processor, wherein the processor activates the delay unit on the basis of this second delay signal so that the delay unit generates the first trigger signal. In this way, the processor can perform the desired delay of the light emitted from the other light source precisely on the basis of the reference clock predetermined by this light source.

The illumination unit contains, for example, a phase mask, which generates the intensity minimum of the de-excitation light distribution. The phase mask can be embodied, for example, in the form of an optical transmission grating, which generates the desired de-excitation light distribution in the sample.

The intensity minimum of the de-excitation light distribution is preferably an intensity zero point. The less residual light is present in the minimum of the de-excitation light distribution, the better is the resolution increase achieved by the superposition of de-excitation and excitation light.

In one preferred embodiment, the scanning microscope comprises a scanning device for scanning multiple illumination target points using the excitation light distribution and the de-excitation light distribution, wherein the processor is designed to assemble multiple pixels representing the illumination target points to form a sample image. In this way, it is possible to generate a two-dimensional sample image consisting of a plurality of pixels, during the image recording of which precise time matching between excitation and de-excitation light is ensured for each individual pixel. It is also possible to generate a one-dimensional line image or a three-dimensional volume image in this way.

In one particularly preferred embodiment, the processor is designed to control the delay for different regions of the sample image differently. In this way, the optimal synchronization can be dynamically adapted not only for different fluorophores and different samples, but also for different sample regions within a single image recording.

In a further embodiment, the invention provides a method for imaging a sample using a fluorescence microscope, comprising the following steps: generating an excitation light distribution, which excites fluorophores present in the sample to the spontaneous emission of fluorescence photons; generating a de-excitation light distribution, which de-excites the fluorophores excited by the excitation light distribution in the sample in the course of a stimulated emission of fluorescence photons; combining the excitation light distribution and the de-excitation light distribution in such a way that an intensity maximum of the excitation light distribution and an intensity minimum of the de-excitation light distribution are spatially superimposed on one another in an illumination target point; detecting the fluorescence photons emitted from the illumination target point as a function of their arrival times; evaluating the fluorescence photons detected in the respective illumination target point with respect to their arrival times; and controlling a delay, which a light pulse or a light modulation of the de-excitation light distribution has at the position of the illumination target point in relation to a light pulse or a light modulation of the excitation light distribution, on the basis of this evaluation.

Figure 1:
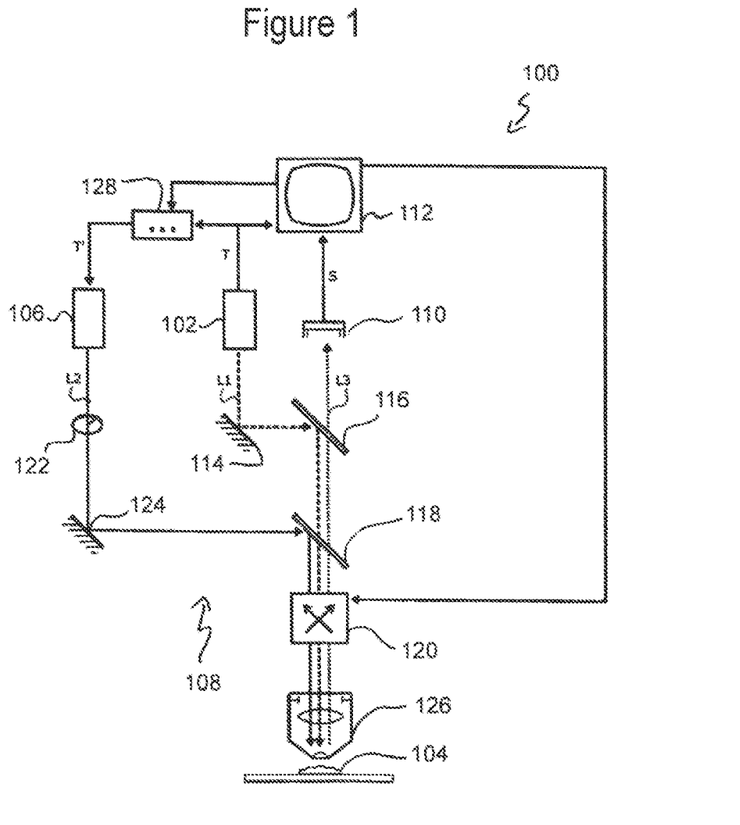
FIG. 1 shows a schematic illustration of a fluorescence microscope according to one exemplary embodiment.

FIG. 1 shows a schematic illustration of a fluorescence microscope 100 according to one exemplary embodiment. In the following, first the fundamental structure and the fundamental functionality of the fluorescence microscope 100 are to be briefly outlined, before a specific implementation according to the exemplary embodiment shown is then explained in more detail.

The fluorescence microscope 100 comprises an excitation light source 102, which is designed to generate a pulsed or modulated excitation light distribution, which excites fluorophores present in a sample 104 to the spontaneous emission of fluorescent light. The wavelength of the excitation light distribution generated by the excitation light source 102 is thus designed for the fluorophores used in the specific application.

The fluorescence microscope 100 furthermore comprises a de-excitation light source 106, which is designed to generate a pulsed or modulated de-excitation light distribution, which de-excites the fluorophores generated by the excitation light distribution in the sample 104 by stimulated emission of fluorescent light. The wavelength of the de-excitation light distribution generated by the de-excitation light source 106 is also matched to the fluorophores used in the specific application. In particular, the wavelength of the de-excitation light distribution is to be selected so that the fluorophores present in the sample 104 are reliably caused by stimulated emission to return from their excited state into the base state upon irradiation using the de-excitation light distribution. For this purpose, the de-excitation light distribution preferably has a wavelength which is approximately equal to the wavelength of the fluorescent light which the fluorophores emit upon the transition from the excited state into the base state.

The fluorescence microscope 100 furthermore has an illumination unit, identified in general by 108 in FIG. 1. The latter is designed so that it combines the excitation light distribution and the de-excitation light distribution in such a way that an intensity maximum of the excitation light distribution and an intensity minimum of the de-excitation light distribution are spatially superimposed on one another in an illumination target point.

The fluorescence microscope 100 furthermore has a detector 110, which detects the fluorescence photons emitted from the illumination target point as a function of their arrival times. Finally, the fluorescence microscope contains a processor 112, which is designed to evaluate the fluorescence photons detected in the illumination target point with respect to their arrival times. On the basis of this evaluation, the processor 112 controls a delay, which a light pulse or a light modulation of the de-excitation light distribution has at the position of the illumination target point in relation to a light pulse or a light modulation of the excitation light distribution.

The structure specifically shown in FIG. 1 merely represents one exemplary embodiment for implementing the above-explained functional principle and in particular is not to restrict the fluorescence microscope 100 to this special embodiment. In the embodiment according to FIG. 1, for example, both the excitation light source 102 and also the de-excitation light source 106 are embodied as pulsed laser light sources. A delay unit 128, the functionality of which is explained below in detail, activatable by the processor 112 is connected upstream of the de-excitation light source 106. The two light sources 102, 106 supply their light in each case to the illumination unit 108, to which in the exemplary embodiment according to FIG. 1 all microscope components are to be assigned with the exception of the two light sources 102, 106, the detector 110, the processor 112, and the delay unit 128.

The excitation light source 102 especially emits excitation light L1, which is reflected via a mirror 114 onto a first wavelength-selective beam splitter 116. The first wavelength-selective beam splitter 116 reflects the excitation light L1 onto a second wavelength-selective beam splitter 118, which transmits the excitation light L1 in the direction of a scanning device 120. In contrast, the de-excitation light source 106 emits the excitation light L2 onto a phase mask 122, which influences the de-excitation light L2 in such a way that the de-excitation light distribution generated in the sample 104 from the excitation light L2 has the desired zero point. After passing through the phase mask 122, the de-excitation light L2 is reflected at a mirror 124 onto the second wavelength-selective beam splitter 118. The latter reflects the de-excitation light L2 in the direction of the scanning device 120, which is controlled by the processor 112.

The excitation light L1 and the de-excitation light L2 are thus superimposed on one another by the second wavelength-selective beam splitter 118 and supplied to the scanning device 120. Proceeding therefrom, the superimposed light distribution is focused by an objective 126 on the illumination target point, whereby the light distribution is generated in the desired form in the illumination target point. The scanning device 120 ensures here that the superimposed light distribution is moved over the sample 104, so that a plurality of illumination target points of the sample 104 are scanned using this light distribution.

Figure 2:
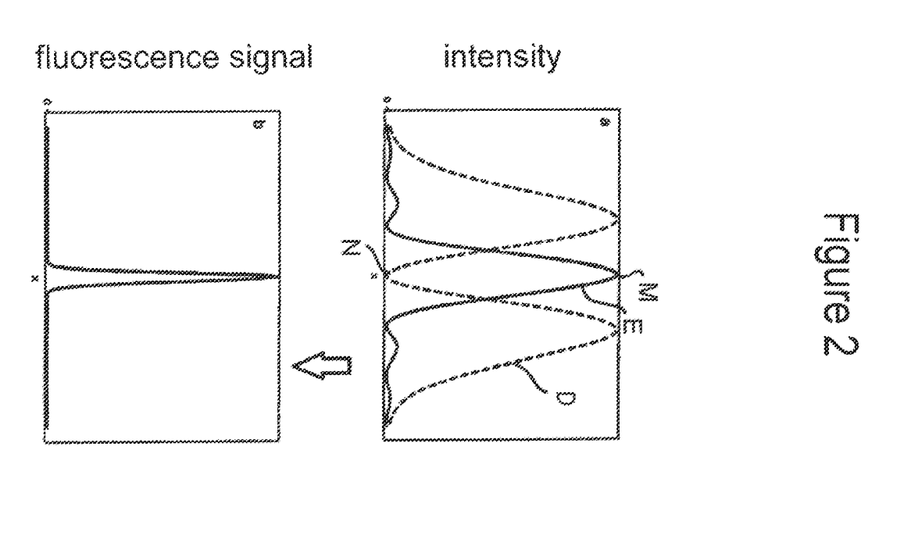
FIG. 2 shows diagrams (a, b) which illustrate the superposition of the excitation light distribution and the de-excitation light distribution and their effect on the detected fluorescence signal.

FIG. 2a shows an exemplary superposition of the light distributions, wherein in this example a one-dimensional light distribution in the direction x is presumed for the sake of simplicity. In FIG. 2a, the excitation light distribution E is shown by a solid line and the de-excitation light distribution D is shown by a dashed line. The two light distributions E, D are combined by the illumination unit 108 in such a way that the zero point N of the de-excitation light distribution E coincides in the direction x with the maximum M of the excitation light distribution E. Due to this superposition, a fluorescence signal results in the respective illumination target point as illustrated in FIG. 2b. This fluorescence signal shows a high-intensity and sharp maximum, the comparatively low full width at half maximum of which determines the spatial resolution in the direction x.

As in turn shown in FIG. 1, the sample 104 illuminated using the superimposed light distribution emits fluorescent light L3, which is returned via the objective 126 to the scanning device 120. In the exemplary embodiment according to FIG. 1, a so-called de-scanned detection of the fluorescent light L3 is thus provided. Subsequently, the fluorescent light L3 passes the two wavelength-selective beam splitters in succession and is incident on the detector 110, which detects the fluorescent light L3 and outputs a corresponding output signal S to the processor 112.

The detector 110 detects the fluorescence photons representing the fluorescent light L3 as a function of their arrival time. The detector 110 is embodied here, for example, so that it detects the arrival times in the course of a time-correlated single photon counting. The detector 110 detects the arrival times of the fluorescence photons in relation to a starting time, which is defined in the present exemplary embodiment by a light pulse, which the excitation light source 102 emits. For this purpose, the excitation light source 102 outputs an electrical trigger signal T to the processor 112, from which the times of the individual laser pulses and thus the above-mentioned starting times can be determined.

The excitation light source 102 additionally outputs the trigger signal T to the delay unit 128, which generates a trigger signal T' that is time delayed in relation to the trigger signal T and supplies it to the de-excitation light source 106. The time delay of the trigger signal T' output by the delay unit 128 is adjusted by the processor 112 coupled to the delay unit 128. For this purpose, the processor 112 evaluates the output signal S, which is output by the detector 110 to the processor 112 and represents a chronological distribution of the fluorescence photons given by the detected arrival times. As a result, the processor 102 adjusts the trigger signal T' controlling the de-excitation light source 106 so that the light pulse of the de-excitation light distribution D has the desired delay at the position of the illumination target point in relation to the light pulse of the excitation light distribution E.

Figure 3:
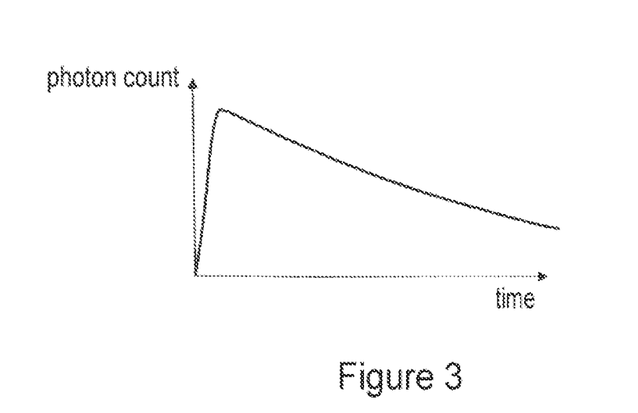
FIG. 3 shows a diagram which shows the number of detected fluorescence photons as a function of the arrival times in a case in which the de-excitation light distribution is inactive.
Figure 4:
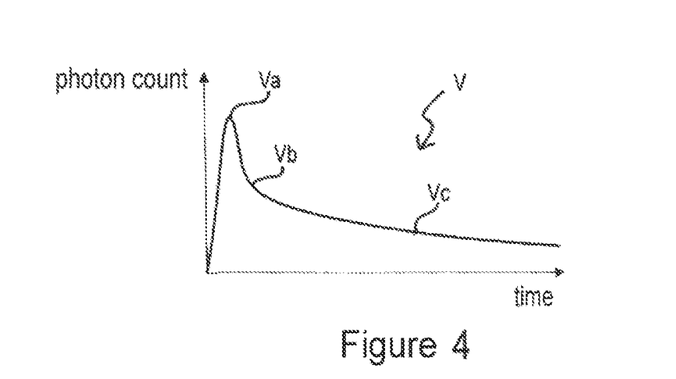
FIG. 4 shows a diagram which shows the number of detected fluorescence photons as a function of the arrival times in a case in which the excitation light distribution and the de-excitation light distribution are matched with one another with respect to time in a desired manner.
Figure 5:
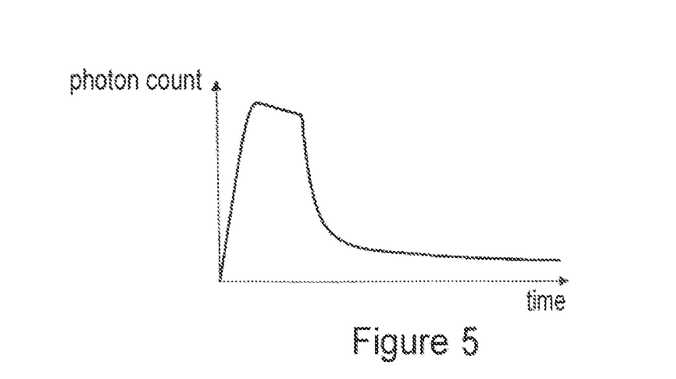
FIG. 5 shows a diagram which shows the number of detected fluorescence photons as a function of the arrival times in a case in which the excitation light distribution and the de-excitation light distribution are not matched with one another with respect to time in the desired manner.

With reference to FIGS. 3 to 5, it is explained hereinafter on the basis of an example how the processor 112 evaluates the output signal S to adjust the delay of the trigger signal T' which the delay unit 128 outputs to the de-excitation light source 106 in relation to the trigger signal T acting as the reference clock which is generated by the excitation light source 102.

FIG. 3 first shows a typical distribution of the fluorescence photons as a function of their arrival times at the detector 110 in a case in which the de-excitation light distribution D does not influence the fluorescence behavior of the sample 104, i.e., the de-excitation light distribution D is inactive for the imaging. This case is self-evidently provided when the de-excitation light L2 is switched off, but also, for example, if the de-excitation pulse occurs before the excitation pulse. With inactive de-excitation light distribution D, the typical exponentially decreasing curve of the photon counting rate is shown having a time constant which corresponds to the mean lifetime of the excited state of the fluorophores.

In contrast, FIG. 4 shows a chronological distribution of the fluorescence photons which results for the case that the light pulse of the de-excitation light distribution D in the illumination target point has an optimal delay for the imaging quality in relation to the light pulse of the excitation light distribution E. The curve shown in FIG. 4 can therefore be saved in the processor 112 as a target distribution V, which the processor 112 uses to evaluate the fluorescence photons detected by the detector 110. For this purpose, the processor 112 compares the actually detected arrival times of the fluorescence photons to the target distribution V and activates the delay unit 128 as a function of the result of this comparison. The processor 112 adjusts the delay of the trigger signal T' output by the delay unit 128 to the de-excitation light source 106 in relation to the trigger signal T used as the reference clock so that the deviation of the chronological distribution of the fluorescence photons detected by the detector 110 in relation to the target distribution V is minimized. The setting of the delay between the trigger signals T' and T preferably takes place in the manner of a control loop during the running image recording.

Like the typical distribution according to FIG. 3, the target distribution V shown in FIG. 4 also first has a distribution maximum Va. A first decreasing distribution section Vb and a second distribution section Vc, decreasing more weakly relative thereto, follow thereon in succession. The two distribution sections Vb and Vc represent two different populations of lifetimes. Thus, a greater part of the fluorescence which is represented by the first distribution section Vb only shows a very short lifetime. The remaining part of the fluorescence, which the second distribution section Vc reflects, shows an exponential drop with the same time constant as the case shown in FIG. 3, in which the de-excitation pulse has no effect.

The short-lived population corresponding to the first distribution section Vb consists in one part of fluorophores which are located at the point of the zero point of the de-excitation light distribution. The other part of the short-lived population consists of fluorophores which are located in the regions subjected to the de-excitation light distribution outside the zero point and which have succeeded in spontaneously emitting a fluorescence photon before they have been de-excited by stimulated emission by the de-excitation light distribution. The strong drop of this short-lived population is caused by the beginning de-excitation light, which induces stimulated emission in a part of the fluorophores and thus opens up a second decay channel having shorter time constant. The second, long-lived population is essentially formed from fluorophores which have not been de-excited by the de-excitation pulse. These fluorophores are located at the position of the zero point of the de-excitation light distribution or in its vicinity. Accordingly, the second distribution section Vc has an exponential drop corresponding to the time constant according to FIG. 3, which is weaker than the drop of the first distribution section Vb.

FIG. 5 shows a chronological distribution of the fluorescence photons for a case in which the delay of the de-excitation pulse in relation to the excitation pulse is set excessively large, i.e., the de-excitation pulse is incident too late on the illumination target point. In this case, a larger part of the fluorophores can already absorb excitation light due to spontaneous emission, in particular also fluorophores which are far away from the zero point of the de-excitation light distribution and the fluorescence photons of which worsen the resolution of the image. The remaining fluorophores are only excited in a controlled manner by the de-excitation light in this region very late, which is visible in the diagram according to FIG. 5 due to the drop of the photon rate at this late time. The resulting image will thus only have a poor resolution since the effective excitation focus is relatively large.

The above-explained embodiments are to be understood solely as examples. They are in particular not restricted to the excitation light distribution specifying the reference clock, with respect to which the delay of the de-excitation light distribution is controlled. It is also conceivable that the de-excitation light distribution specifies the reference clock and the excitation light distribution is delayed relative to this clock.

Furthermore, in the exemplary embodiment according to FIG. 1, the excitation light source 102 and the de-excitation light source 106 are each embodied as pulsed laser light sources. However, it is also possible to use modulated sources for the light sources 102, 106, if the light modulation provided in this way is sufficiently fast in consideration of the mean lifetime of the fluorophores used.

Although some aspects have been described in the context of a device, it is clear that these aspects also represent a description of the corresponding method, wherein a block or a device corresponds to a method step or a function of a method step. Similarly thereto, aspects which are described in the context of a method step also represent a description of a corresponding block or element or a property of a corresponding device. Some or all method steps can be executed by (or using) a hardware device, which can be, for example, a processor, a microprocessor, a programmable computer, or an electronic circuit. In some exemplary embodiments, one or more of the most important method steps can be executed by such a device.

Depending on specific implementation requirements, exemplary embodiments of the invention can be implemented in hardware or software. The implementation can be carried out using a nonvolatile storage medium such as a digital storage medium, for example, a diskette, a DVD, a Blu-ray, a CD, a ROM, a PROM an EPROM, an EEPROM, or a FLASH memory, on which electronically readable control signals are stored, which interact (or can interact) with a programmable computer system so that the respective method is carried out. The digital storage medium can therefore be computer readable.

Some exemplary embodiments according to the invention comprise a data carrier having electronically-readable control signals which can interact with a programmable computer system so that one of the methods described herein is carried out.

In general, exemplary embodiments of the present invention can be implemented as a computer program product having a program code, wherein the program code acts to execute one of the methods when the computer program product runs on a computer. The program code can be stored, for example, on a machine-readable carrier.

Further exemplary embodiments comprise the computer program for carrying out one of the methods described herein, which is stored on a machine-readable carrier.

In other words, one exemplary embodiment of the present invention is therefore a computer program having a program code for carrying out one of the methods described herein when the computer program runs on a computer.

A further exemplary embodiment of the present invention is therefore a storage medium (or a data carrier or a computer-readable medium), which comprises a computer program stored thereon for executing one of the methods described herein when it is executed by a processor. The data carrier, the digital storage medium, or the recorded medium are generally tangible and/or not seamless. A further exemplary embodiment of the present invention is a device as described herein which comprises a processor and the storage medium.

A further exemplary embodiment of the invention is therefore a data stream or a signal sequence which represents the computer program for carrying out one of the methods described herein. The data stream or the signal sequence can be configured, for example, so that it is transmitted via a data communication connection, for example, via the Internet.

A further exemplary embodiment comprises a processing means, for example a computer or a programmable logic device, which is configured or adapted to execute one of the methods described herein.

A further exemplary embodiment comprises a computer on which the computer program for executing one of the methods described herein is installed.

A further exemplary embodiment according to the invention comprises a device or a system which is configured to transmit (for example electronically or optically) a computer program for executing one of the methods described herein to a receiver. The receiver can be, for example, a computer, a mobile device, a storage device, or the like. The device or the system can comprise, for example, a file server for transmitting the computer program to the receiver.

In some exemplary embodiments, a programmable logic device (for example, a field-programmable gate array (FPGA)) can be used to execute some or all functionalities of the methods described herein. In some exemplary embodiments, a field-programmable gate array can cooperate with a microprocessor to carry out one of the methods described herein. In general, the methods are preferably carried out by any hardware device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 fluorescence microscope
102 excitation light source
104 sample
106 de-excitation light source
108 illumination unit
110 detector
112 processor
114 mirror
116 wavelength-selective beam splitter
118 wavelength-selective beam splitter
120 scanning device
122 phase mask
124 mirror
126 objective
128 delay unit
E excitation light distribution
D de-excitation light distribution
M intensity maximum of the excitation light distribution
N zero point of the de-excitation light distribution
V target distribution
Va maximum of the target distribution
Vb first distribution section
Vc second distributional section

The invention claimed is:

1. A fluorescence microscope, comprising:
an excitation light source, which is designed to generate a pulsed or modulated excitation light distribution, which excites fluorophores present in a sample to spontaneous emission of fluorescence photons,
a de-excitation light source, which is designed to generate a pulsed or modulated de-excitation light distribution, which de-excites the fluorophores excited by the excitation light distribution in the sample in a course of a stimulated emission of fluorescence photons,
an illumination unit, which is designed to combine the excitation light distribution and the de-excitation light distribution in such a way that an intensity maximum of the excitation light distribution and an intensity minimum of the de-excitation light distribution are spatially superimposed on one another in an illumination target point,
a detector, which is designed to detect the fluorescence photons emitted from the illumination target point as a function of arrival times of the fluorescence photons, and
a processor, which is designed to evaluate the fluorescence photons detected in the illumination target point with respect to their arrival times and, based on the evaluation, to control a delay which a light pulse or a light modulation of the de-excitation light distribution has at a position of the illumination target point in relation to a light pulse or a light modulation of the excitation light distribution.

2. The fluorescence microscope as claimed in claim 1, wherein the detector is designed to detect the fluorescence photons emitted from the illumination target point by time-correlated single photon counting as a function of the arrival times.

3. The fluorescence microscope as claimed in claim 1, wherein the detector is designed to detect the arrival times of the fluorescence photons in relation to a starting time, which is defined by the light pulse or the light modulation of the excitation light distribution or the de-excitation light distribution.

4. The fluorescence microscope as claimed in claim 1, wherein the processor is designed to evaluate the fluorescence photons detected in the illumination target point by comparing a chronological distribution of the fluorescence photons given by the detected arrival times to a target distribution, and by controlling the delay based on the comparison.

5. The fluorescence microscope as claimed in claim 4, wherein the target distribution has, in chronological succession, a distribution maximum, a first decreasing distribution section, and a second, relatively more weakly decreasing distribution section.

6. The fluorescence microscope as claimed in claim 4, wherein the processor is designed to adjust the delay based on the comparison in a manner of a control loop.

7. The fluorescence microscope as claimed in claim 1, wherein the illumination unit contains a phase mask, which is designed to generate the intensity minimum of the de-excitation light distribution.

8. The fluorescence microscope as claimed in claim 1, wherein the intensity minimum of the de-excitation light distribution is an intensity zero point.

9. The fluorescence microscope as claimed in claim 1, further comprising a scanning unit designed to scan multiple illumination target points using the excitation light distribution and the de-excitation light distribution, wherein the processor is designed to assemble multiple pixels representing the illumination target points to form a sample image.

10. The fluorescence microscope as claimed in claim 9, wherein the processor is designed to control the delay differently for various regions of the sample image.

11. A method for imaging a sample using a fluorescence microscope, the method comprising:
generating an excitation light distribution, which excites fluorophores present in the sample to spontaneous emission of fluorescence photons,
generating a de-excitation light distribution, which de-excites the fluorophores excited by the excitation light distribution in the sample in a course of a stimulated emission of fluorescence photons,
combining the excitation light distribution and the de-excitation light distribution in such a way that an intensity maximum of the excitation light distribution and an intensity minimum of the de-excitation light distribution are spatially superimposed on one another in an illumination target point,
detecting the fluorescence photons emitted from the illumination target point as a function of arrival times of the fluorescence photons,
evaluating the fluorescence photons detected in the illumination target point with respect to the arrival times, and
controlling a delay which a light pulse or a light modulation of the de-excitation light distribution has at a position of the illumination target point in relation to a light pulse or a light modulation of the excitation light distribution based on the evaluation.

12. A fluorescence microscope, comprising:
an excitation light source, which is designed to generate a pulsed or modulated excitation light distribution, which excites fluorophores present in a sample to spontaneous emission of fluorescence photons,
a de-excitation light source, which is designed to generate a pulsed or modulated de-excitation light distribution, which de-excites the fluorophores excited by the excitation light distribution in the sample in a course of a stimulated emission of fluorescence photons,
an illumination unit, which is designed to combine the excitation light distribution and the de-excitation light distribution in such a way that an intensity maximum of the excitation light distribution and an intensity minimum of the de-excitation light distribution are spatially superimposed on one another in an illumination target point,
a detector, which is designed to detect the fluorescence photons emitted from the illumination target point as a function of arrival times of the fluorescence photons,
a processor, which is designed to evaluate the fluorescence photons detected in the illumination target point with respect to their arrival times and, based on the evaluation, to control a delay which a light pulse or a light modulation of the de-excitation light distribution has at a position of the illumination target point in relation to a light pulse or a light modulation of the excitation light distribution, and
a delay unit, which is controllable by the processor based on the evaluation to set the delay,
wherein the delay unit is connected upstream from the excitation light source or the de-excitation light source, and is designed to output a first trigger signal to the excitation light source or the de-excitation light source to adjust the delay.

13. The fluorescence microscope as claimed in claim 12, wherein the one of the two light sources, which is not connected upstream from the delay unit, is designed to output a second trigger signal to the delay unit, and wherein the delay unit is designed to generate a signal delayed in time in relation to the second trigger signal as the first trigger signal.

14. The fluorescence microscope as claimed in claim 13, wherein the one of the two light sources, which is not connected upstream from the delay unit, is designed to output the second trigger signal to the processor, and wherein the processor is designed to control the delay unit based on the second trigger signal to generate the first trigger signal.

* * * * *